United States Patent Office.

ADRIEN RALU, FILS, OF PARIS, FRANCE.

PROCESS OF TREATING AND AMELIORATING ALCOHOLS AND ALCOHOLIC LIQUORS.

SPECIFICATION forming part of Letters Patent No. 273,604, dated March 6, 1883.

Application filed April 4, 1882. (No specimens.) Patented in France March 14, 1882.

*To all whom it may concern:*

Be it known that I, ADRIEN RALU, Fils, a citizen of France, residing at Rue Condorcet, Paris, in the Republic of France, have invented new and useful Improvements in the Process of Treating and Ameliorating Alcohols and Alcoholic Liquors, of which the following is a specification.

My invention relates to the purification, improvement, and aging of alcoholic liquors—such as rum, whisky, brandy, and gin—thereby counteracting the effect upon the human system of the deleterious action of the essential and empyreumatic oils found in such liquors after distillation, as well as the amylic alcohol which is present in liquors distilled in whole or in part from potatoes, as well as in genuine wine-brandy.

My invention consists in adding to the alcoholic liquors after distillation, and in the proportions hereinafter named, fatty matters or extracts obtained from vegetable or animal matters, either in a fluid or solid state, mingled with glycerine, and whipping or churning the liquor after such addition, in order to effect a most thorough intermingling, and finally separating out any insoluble compounds or substances, whether in the form of a precipitate or otherwise, by decanting or filtering, or both.

This process is based upon the fact that alcohols do not improve materially when bottled, but require to be kept a certain time in charred casks. By my invention a large part of the essential or empyreumatic oils are eliminated by whipping and churning after adding the mingled fatty matters and glycerine, as the former—to wit, the essential oils contained in the liquors—have a greater affinity for the fatty matters introduced than for the alcohol, and will therefore unite, while the glycerine, which is perfectly soluble in alcohol, and which is in itself a fluid oily body, will not only improve the alcohol, as if by age, but will neutralize or counteract the few deleterious principles or ingredients remaining in the liquor after the process is complete.

In carrying out my process, I take preferably pure cocoa-fat, and add glycerine that has been deprived of all acid, and in some cases a third ingredient may be added consisting of powdered burnt sugar. The cocoa-fat is melted in a water bath and mixed in the proportion of one kilo to two liters of glycerine, and when cold is poured into twenty-five hundred liters of alcohol at about 54° strength by Gay-Lussac's centesimal alcoometer, which, being whipped or churned by means of any beating or stirring apparatus, assimilates all that is capable of being dissolved of the mixture. The operation is repeated the next day from ten to twelve hours and the alcohol is left to settle. Any parts of the matters mixed with the alcohol—that is to say, any portion of the fatty bodies and glycerine—which may not then be dissolved are precipitated, or will be found floating on the liquor when the process is at an end, and may be separated out by decanting or filtering. After a week in summer and a fortnight in winter the alcohol is ready. It is then filtered and put into casks.

In the treatment of distilled liquors, the quantities of cocoa-fat and glycerine depend upon the degree of strength of the liquid to be treated; but on an average eight grams of cocoa-fat and four and one-half grams of glycerine to twenty liters of alcohol of 30° to 39° strength by Gay-Lussac's centesimal alcoometer, ten grams of cocoa-fat and six grams of glycerine to twenty liters of alcohol of 40° to 54° strength by Gay-Lussac's centesimal alcoometer, twelve grams of cocoa-fat and nine grams of glycerine to twenty-nine liters of alcohol of 55° to 75° strength by Gay-Lussac's centesimal alcoometer, and sixteen grams of cocoa-fat and ten and one-half grams of glycerine to twenty liters of alcohol of 90° strength by Gay-Lussac's centesimal alcoometer, will be suitable proportions.

Alcoholic liquors are to be treated with cocoa-fat and glycerine in the above proportions, the proportions being adapted to the percentage of alcohol contained in such liquors, the heavier liquors—such as Scotch and Irish whiskies, which contain fifty per cent. and over of alcohol—requiring a proportionately larger amount of cocoa-fat and glycerine for treatment than liquors which contain a less percentage of alcohol.

Instead of the materials named, I may use any of the fats or oils of cocoa, palm, or from the bassia, mingled with glycerine in the manner described.

This process may also be used with the fermented mash from which the several alcoholic liquors mentioned are distilled. In such a case, the percentage of alcohol being approximately ascertained, I add to the mash, just before it is put into the still, a certain proportion of the ingredients named, the quantity thereof being determined by the percentage of alcohol in the mash. The latter is then poured into the still, and after distillation is complete the liquor which has come over is whipped and churned in the manner already described.

I am aware that fatty matters, oils, &c., as well as glycerine, have been used separately for the amelioration of alcohols; but I am not aware of any case in which both fatty matters or oils, together with glycerine, have been used combined together and intimately mingled with each other in the manner proposed by my invention. By my process I neutralize the principles of the acid essential or empyreumatic oils contained in alcoholic liquors, and thereby prevent their deleterious action upon the system, and at the same time improve and age said liquors and increase their bouquet, the whipping or churning being merely an accessory step for securing a thorough mixture of the grease and glycerine with the alcohol.

What I claim is—

The herein-described process of ameliorating, improving, and aging alcoholic liquors by adding to them, in the proportions described, fatty matters derived from vegetable or animal substances mingled with glycerine, and whipping or churning the liquor at intervals to effect a thorough admixture of said substances, and finally decanting or filtering, or both, to separate out the uncombined or undissolved substances, whether the same be or be not precipitated, substantially as described.

AD. RALU, FILS.

Witnesses:
H. BONNEVILLE,
G. LOMBARD.